United States Patent [19]

Devine, Jr.

[11] 4,408,709
[45] Oct. 11, 1983

[54] METHOD OF MAKING TITANIUM-STABILIZED FERRITIC STAINLESS STEEL FOR PREHEATER AND REHEATER EQUIPMENT APPLICATIONS

[75] Inventor: Thomas M. Devine, Jr., Scotia, N.Y.

[73] Assignee: General Electric Company, Schenectady, N.Y.

[21] Appl. No.: 424,113

[22] Filed: Sep. 27, 1982

Related U.S. Application Data

[60] Division of Ser. No. 244,379, Mar. 16, 1981, Pat. No. 4,374,666, which is a continuation-in-part of Ser. No. 234,213, Feb. 13, 1981, abandoned.

[51] Int. Cl.$^3$ .................... B23K 31/06; C22C 38/28
[52] U.S. Cl. ......................... 228/183; 29/157.3 A; 122/DIG. 13; 148/37; 228/263.15
[58] Field of Search ............... 75/126 D; 148/12 EA, 148/37; 122/235 R, 235 C; 29/157.3 A; 228/183, 263.15

[56] References Cited

U.S. PATENT DOCUMENTS

| | | | |
|---|---|---|---|
| 3,250,611 | 5/1966 | Lula et al. | 148/12 EA |
| 3,823,704 | 7/1974 | Daugirda et al. | 122/235 R |
| 3,953,201 | 4/1976 | Wood et al. | 75/126 D |
| 4,059,440 | 11/1977 | Takemura et al. | 75/126 C |
| 4,171,015 | 10/1979 | Bucey et al. | 29/157.3 A |
| 4,262,635 | 4/1981 | Dauvergne et al. | 122/235 C |

FOREIGN PATENT DOCUMENTS

| | | | |
|---|---|---|---|
| 2426229 | 1/1980 | France | 122/235 C |
| 52-41113 | 3/1977 | Japan | 75/124 F |
| 54-51921 | 4/1979 | Japan | 75/126 D |
| 54-72711 | 6/1979 | Japan | 75/126 D |
| 54-126620 | 10/1979 | Japan | 75/126 F |

OTHER PUBLICATIONS

Demo, "Structure and Constitution of Wrought Ferritic Stainless Steels" Handbook of Stainless Steels, McGraw-Hill Book Co., 1977, pp. 5-1 to 5-40.
Davison et al., "The New Ferritic Stainless Steels", Metal Progress, Jun. 1979, 115(6), pp. 40-46.
Metals Abstracts, No. 35-0455, "Corrosion of Several Alloys in Superheated Steam at 482° and 538° C.", Apr. 1980, p. 126.

Primary Examiner—Peter K. Skiff
Attorney, Agent, or Firm—Leo I. MaLossi; James C. Davis, Jr.; James Magee, Jr.

[57] ABSTRACT

This invention provides two stabilized corrosion-resistant ferritic stainless steels particularly suitable for long term use as tubing in the service environments frequently found in moisture separator reheater and feedwater preheater equipment in the steam supply systems of commercial electrical power generating stations.

1 Claim, 5 Drawing Figures

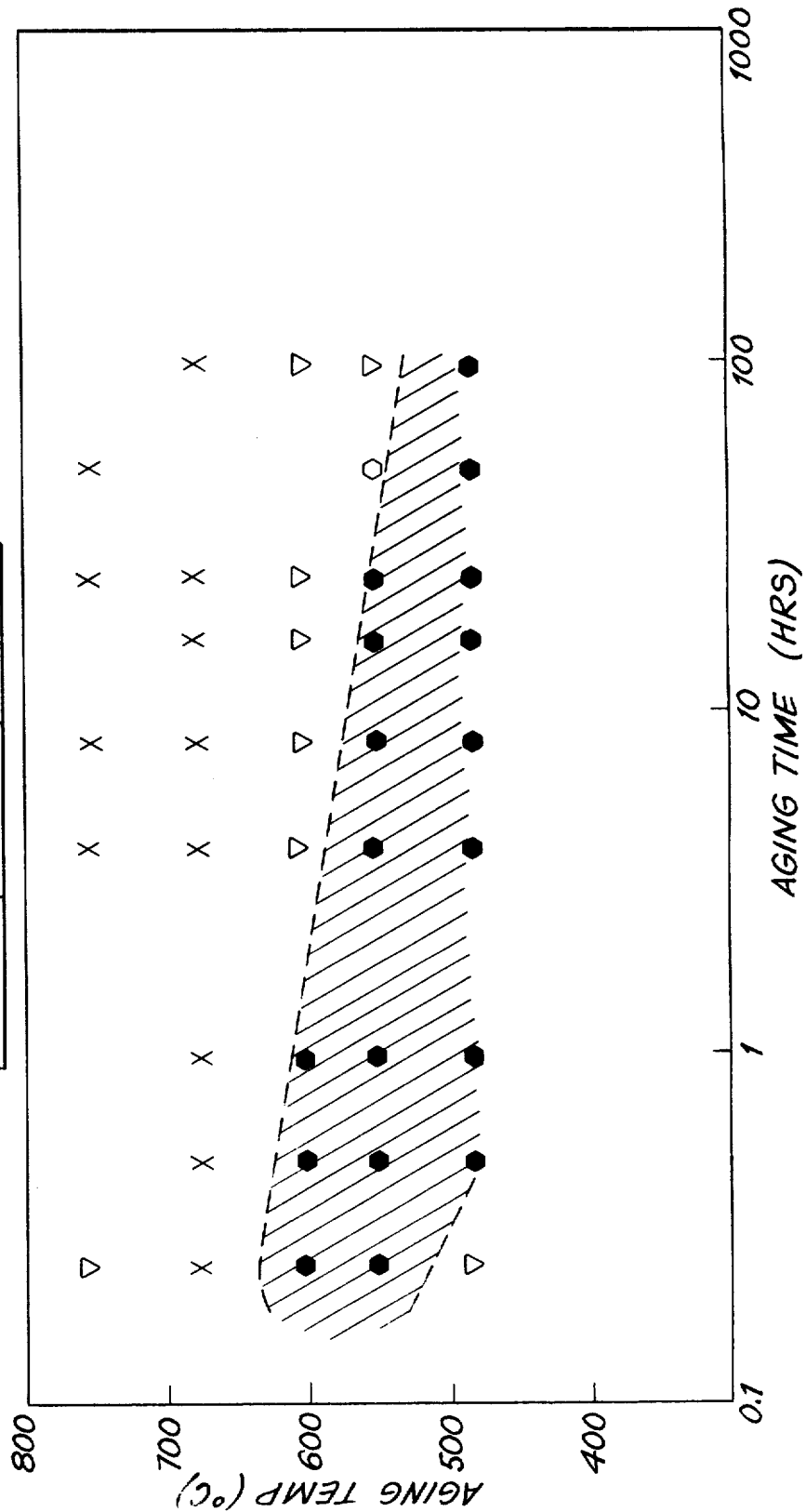

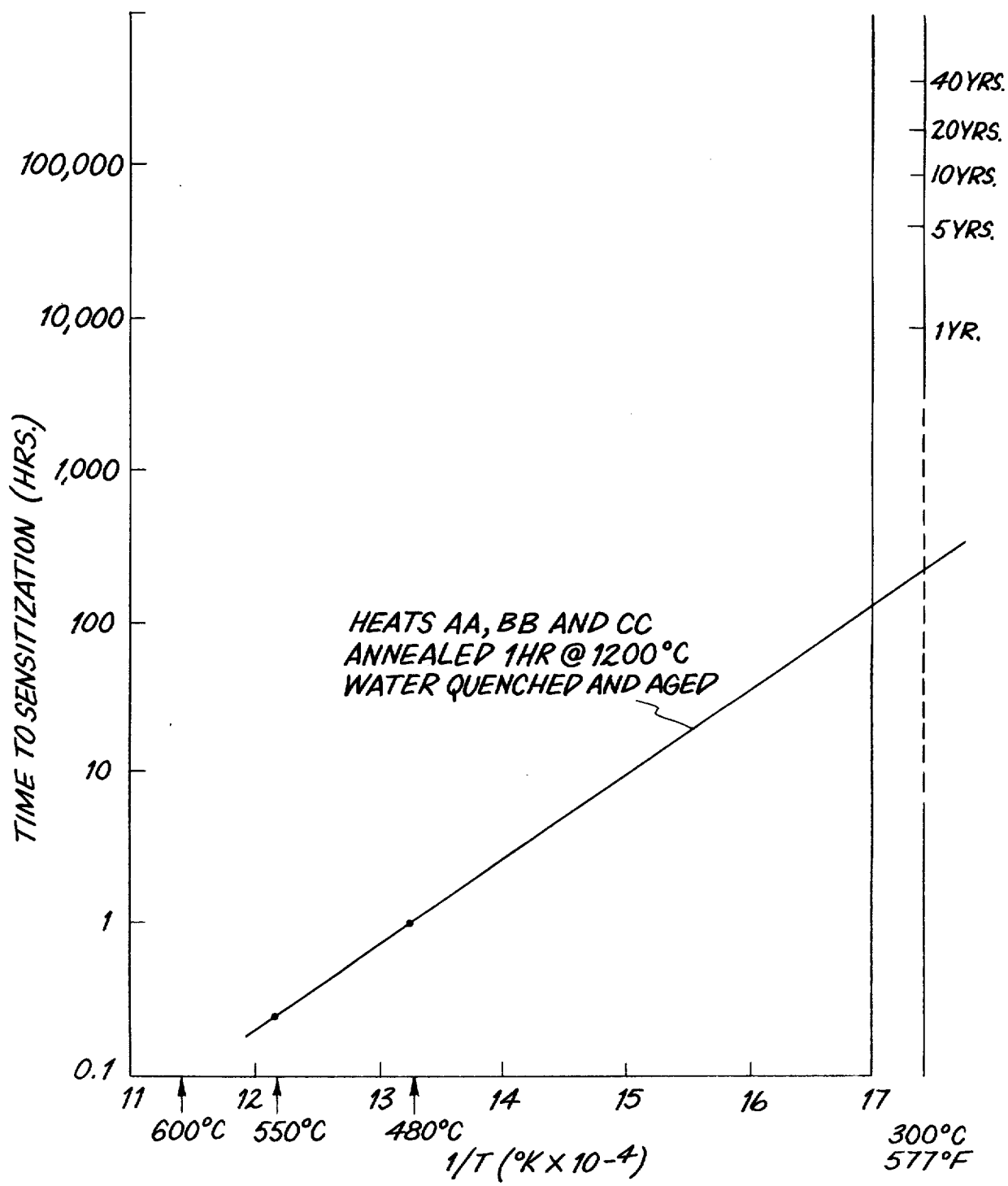

METHOD OF MAKING TITANIUM-STABILIZED FERRITIC STAINLESS STEEL FOR PREHEATER AND REHEATER EQUIPMENT APPLICATIONS

CROSS REFERENCE TO RELATED PATENT APPLICATION

This application is a division of application Ser. No. 244,379, filed Mar. 16, 1981, which issued as U.S. Pat. No. 4,374,666 on Feb. 22, 1983, and which in turn is a continuation-in-part of application Ser. No. 234,213, filed Feb. 13, 1981, which is now abandoned. The entirety of said Ser. Nos. 244,379 and 234,213 applications are incorporated herein by reference.

The invention herein is related to the invention disclosed and claimed in U.S. patent application Ser. No. 429,750, filed Sept. 30, 1982, which in turn is a continuation of application Ser. No. 268,458, filed May 29, 1981, which is assigned to the same assignee as the instant application and is entitled "Zirconium Stabilized Ferritic Stainless Steels."

BACKGROUND OF THE INVENTION

1. Field of the Invention

This invention relates to stabilized stainless steels in general and particularly to stabilized ferritic stainless steels suitable for long term use in the service environments frequently found, for example, in moisture separator reheater and feedwater preheater equipment in the steam supply systems of commercial electrical power generating stations.

2. Description of the Prior Art

In the metallurgical arts, stainless steels are those alloys of iron which contain sufficient amounts of alloying elements, principally chromium, to impart corrosion and scale resistance. It is known in the art that at least about 12 weight percent chromium is required to impart the levels of corrosion and scale resistance commonly attributed to stainless steels in aqueous media. The corrosion and scale resistance imparted by chromium is derived from its ability to form a protective, or passivating, film.

Under certain circumstances, however, it is possible to lose the beneficial effects of chromium through a phenomenon frequently referred to as sensitization. A sensitized stainless steel is one which is susceptible to intergranular corrosion (IGC) or intergranular stress corrosion cracking (IGSCC) as a result of the precipitation of chromium-rich carbides at the grain boundaries. With the formation of the precipitates there is a concomitant depletion of chromium below the level required for corrosion resistance in areas adjacent to the grain boundary. This description of the mechanism by which stainless steels are sensitized is referred to in the art as the grain boundary chromium depletion model. Sensitization has been most extensively studied and the bulk of the prior art literature relates to the austenitic class of stainless steels.

Susceptibility to sensitization is a function of the chemistry of the alloy; the prior physical condition including, for example, the extent of any cold deformation; and the nature of sites available for the precipitation of chromium-rich carbides. Sensitization is also a kinetic phenomenon. Therefore, sensitization is also a function of the techniques used in its accessment and can be influenced by the thermo-mechanical history developed during processing and fabrication. For example, a stainless steel heated to an elevated temperature, as during a welding operation, and cooled slowly may exhibit sensitization whereas the same stainless steel heated in the same manner but cooled very rapidly may not.

One technique for preventing sensitization is to reduce the carbon content to extremely low levels (typically less than about 0.030%). Low carbon levels minimize the amount of carbon available for carbide formation and, therefore, the extent of formation of chromium-rich carbides. For some applications, however, such as where high strength is required, a decreased carbon content is not desirable.

Another means for avoiding sensitization is to add other alloying elements, known as stabilizers, such as niobium and titanium, which have stronger carbide-forming tendencies than chromium. These elements rather than the chromium form carbides thus permitting the matrix to retain the corrosion inhibiting chromium. However, the use of niobium or titanium has been shown not to be a panacea as it is possible to sensitize these so-called stabilized austenitic stainless steels through improper heat treatments or fabrication techniques. Also, excessive amounts of these elements may embrittle the stainless steel.

The phenomenon of sensitization of ferritic stainless steels was first reported in 1933 by Houdremont and Shafmeister (Archiv. fur das Eisenhuttenwessen, 7, p. 187, 1933). Since that time, relatively few investigations have been conducted on the sensitization of ferritic stainless steels compared to the vast number of papers published on the sensitization of austenitic stainless steels. The apparent lack of interest in the sensitization behavior of ferritic stainless steels in the past was chiefly due to their low toughness and, therefore, limited usefulness as materials of construction. Then, in 1950, Binder and Spendelow reported in the Transactions of the ASTM (43, p. 759, 1950) that the toughness of ferritic stainless steels could be greatly improved by the reduction of the interstitials carbon and nitrogen. The advent of special melting practices, e.g., argon-oxygen decarburization (AOD), vacuum-oxygen decarburization (VOD), and electron beam melting, made available low interstitial ferritic stainless steels of excellent toughness. The application of ferritic stainless steels to structural components was, therefore, no longer necessarily precluded by low toughness and in many applications the use of ferritic stainless steels is now largely regulated by corrosion resistance. Consequently, an understanding of the mechanisms of sensitization of ferritic stainless steels, particularly the stabilized ferritic stainless steels, became of importance.

The earlier work was conducted on unstabilized ferritic stainless steels and employed the techniques pioneered during studies of the austenitic stainless steels. The prior art investigators have generally concluded that the grain boundary chromium depletion model adequately explains the sensitization of unstabilized ferritic stainless steels, as it did for the austenitic stainless steels, although the kinetics for the two types of steel are generally different.

If grain boundary chromium depletion is responsible for the sensitization of ferritic stainless steels, then, as in the case of austenitic stainless steels, the addition of titanium and niobium should inhibit sensitization. That general premise is true, however, there exist differences of opinion among the experts relative to the amount of titanium required for the stabilization of ferritic stainless steels. Further, there are some references extant in the literature which stand for the proposition that excessive additions of stabilizers, particularly titanium, inherently result in mechanical embrittlement particularly when thick, i.e., greater than about 0.254 cm (0.100 in), sections are involved. Work in this area is sparse and, on the other hand, tends to be limited to specific alloys and, as th work of Demo (Met. Trans., 5, 2253, 1974), not readily transferable to alloys of other compositions. On the other hand, the work of Abo et al. ("Stainless Steels '77," Climax Molybdenum Company, 1977) stands for the broad premise that titanium additions should be as low as possible since even small amounts of titanium raise the ductile-to-brittle transition temperature and further additions raise that transition temperature even further to an asymptotic maximum.

As materials of construction, the ferritic stainless steels are prime candidates for replacing conventional materials now found in heat exchangers such as moisture separator reheaters (MSR) and feedwater preheaters (FWP) frequently found in the steam supply systems of fossil-fired and nuclear fueled commercial electrical power generating stations.

Illustrative of the applications and present materials of construction are the moisture separator reheater units. These units are located between the high pressure turbine and the low pressure turbine of most nuclear steam generating units. As its name suggests, an MSR accepts the exhaust steam from the high pressure turbine, separates out the moisture, reheats the steam and directs it toward the low pressure turbine. The moisture separation is achieved by passing the steam over a set of chevron plates onto which the condensate collects. The steam reheat is typically accomplished by passing a first medium, i.e., high temperature pressurized steam, through enclosing members such as thin-walled tubes. These tubes are generally arranged in closely spaced arrays and frequently are finned on the outside to facilitate heat transfer. The second medium, i.e., the exhaust steam to be heated, is passed through gaps in the array. Heat passes through the tube walls from the high temperature steam to the low temperature steam. The service conditions thus encompass exposure to temperatures on the order of about 300° C. and chloride and hydroxide ions, from impurities in the water, which are capable of causing stress corrosion cracking. Welding is extensively used in the manufacture of the tubes. The tubes are frequently formed from strip material formed into tubes, seam welded longitudinally, and finned; adjacent sections of the tubes are butt welded, and the tubes are terminated by welding into tube sheets.

Copper-containing low-alloy steel is one material presently employed as an MSR tubing material. Unfortunately, because of its low corrosion resistance, a rust-film can form on the surface of the finned low-alloy steel tubes. This rust film can bridge the gap between adjacent fins (a phenomenon referred to as "rust bridging") thereby reducing the heat transfer between the steam flowing inside and outside of the tube.

BRIEF DESCRIPTION OF THE INVENTION

Ferritic stainless steels have been proposed as alternate materials for use in heat exchangers, such as moisture separator reheaters and feedwater preheaters, frequently found in the steam supply systems of fossil-fired and nuclear fueled commercial electrical power generating stations.

Susceptibility to sensitization was unexpectedly discovered during the evaluation of two grades of titanium-stabilized ferritic stainless steel for use as tubing in heat exchangers. The susceptibility to sensitization was predicted to occur under conditions of long-time (about 40 years) exposure at intermediate temperatures (about 300° C.) following a simulated welding operation.

Two new stabilized ferritic stainless steels were, therefore, invented in response to the discovered susceptibility to sensitization of the prior art steels. An 18% chromium—2% molybdenum version consists essentially of, in weight percent, 0.025% max carbon, 0.025% max nitrogen, 1.0% max silicon, 1.0% max manganese, 0.04% max phosphorous, 0.03% max sulfur, 18 to 20% chromium, 1.75 to 2.25% molybdenum, titanium in percentage selected such that the titanium to carbon ratio is equal to or greater than 45, the sum of carbon plus nitrogen is 0.045% max, and the balance is iron plus impurities. A 12% chromium version consists essentially of, in weight percent, 0.025% max carbon, 0.025% max nitrogen, 1.0% max silicon, 1.0% max manganese, 0.04% max phosphorous, 0.03% max sulfur, 12 to 13% chromium, titanium in percentage selected such that the titanium to carbon ratio is equal to or greater than 50, the sum of carbon plus nitrogen is 0.045% max, and the balance is iron plus impurities.

BRIEF DESCRIPTION OF THE DRAWINGS

FIG. 4 is a semilogarithmic graph of the sensitization of heat AA as functions of aging time and aging temperature following water quenching after an anneal for 1 hour at 1200° C.

FIG. 5 is a semilogarithmic graph of the minimum observed time for sensitization to occur versus inverse absolute temperature whereon the time for sensitization to occur in heats AA, BB, and CC is extrapolated to the typical service temperatures of moisture separator reheaters and feedwater preheaters.

DETAILED DESCRIPTION OF THE INVENTION

Figure 1:
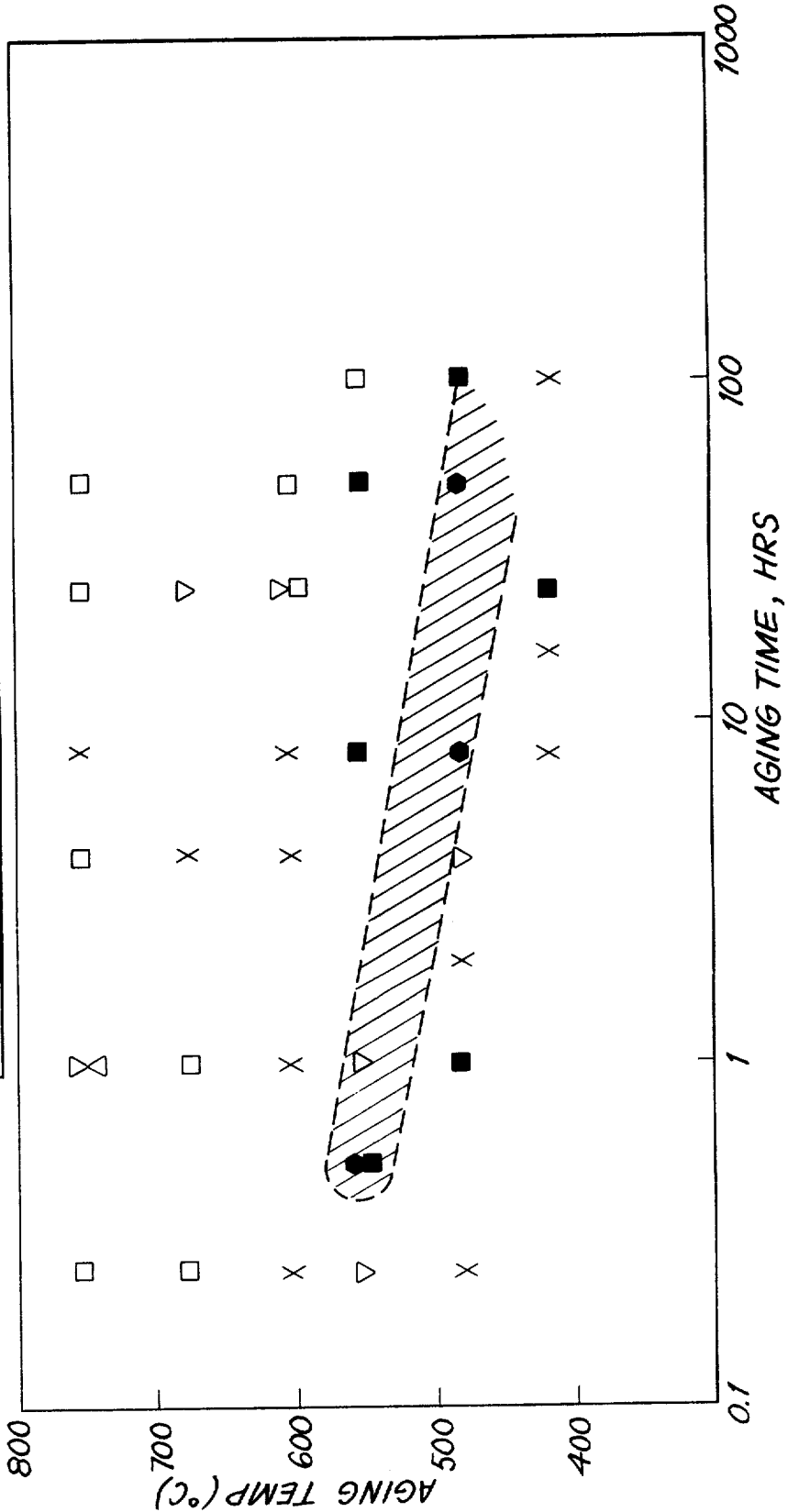
FIG. 1 is a semilogarithmic graph of the embrittlement and sensitization of heat A as functions of aging time and aging temperatures following water quenching after an anneal for 1 hour at 1200° C.

Ferritic stainless steels were selected for evaluation as alternate materials for use as tubes in moisture separator reheaters and feedwater preheaters. A commercially produced stabilized ferritic stainless steel having a nominal composition of 18Cr-2Mo-0.6Ti was selected for initial study. Its composition is listed in Table I, below, and is identified as heat A.

Several prior art teachings relative to the amount of titanium required to stabilize ferritic stainless steels are presented in Table II, below. As in Table II, these prior art teachings are generally presented as formulas or graphs which are said to be capable of predicting the amount of titanium required to stabilize ferritic stainless steels if their carbon and nitrogen contents are known. It should be noted that the prior art investigations and criteria derived therefrom are based on sensitizing treatments which employed welding operations or high temperature heat treatment without subsequent aging to simulate long term service exposure.

welding. The 800° C. anneal represents a typical process anneal.

The annealed and quenched specimens were subdivided into smaller groups and for each annealing temperature subgroups were aged at temperatures of 415°, 480°, 550°, 600°, 675°, or 750° C. for times of ¼, ½, 1, 2,

TABLE I

Compositions[1] of 18Cr—2Mo Type Ferritic Stainless Steels (wt. %)

| Heat | C | Si | Mn | P | S | Cr | Mo | Ti | N | Bal[2] | Ti/C | Ti/N | Ti/C + N | Sensitization Resistance Evaluation |
|---|---|---|---|---|---|---|---|---|---|---|---|---|---|---|
| A | 0.023 | 0.16 | 0.33 | 0.019 | 0.012 | 17.15 | 2.23 | 0.61 | 0.003 | Fe | 26.5 | 203.3 | 23.5 | FAIL |
| B | 0.023 | 0.46 | 0.44 | 0.024 | 0.005 | 17.40 | 2.25 | 0.32 | 0.015 | Fe | 13.9 | 21.3 | 8.4 | FAIL |
| C | 0.018 | 1.0 max | 1.0 max | 0.04 max | 0.03 max | 18.50 | 2.12 | 0.48 | 0.009 | Fe | 26.7 | 53.3 | 17.8 | FAIL |
| D | 0.014 | ↓ | ↓ | ↓ | ↓ | 18.47 | 2.08 | 0.95 | 0.026 | Fe | 67.9 | 36.5 | 23.8 | PASS |
| E | 0.011 | ↓ | ↓ | ↓ | ↓ | 18.70 | 2.15 | 0.52 | 0.028 | Fe | 47.3 | 18.6 | 13.3 | PASS |
| F | 0.033 | ↓ | ↓ | ↓ | ↓ | 18.0 | 2.0 | 0.42 | 0.031 | Fe | 12.7 | 13.6 | 6.6 | FAIL |
| G | 0.016 | ↓ | ↓ | ↓ | ↓ | 17.91 | 2.01 | 0.46 | 0.018 | Fe | 28.8 | 25.6 | 13.5 | FAIL |

[1]Heats A and B by analysis
Heats C-G by analysis except Si, Mn, P, and S max per specification
[2]Plus incidental impurities

TABLE II

Prior Art Stabilization Criteria for Ferritic Stainless Steels

| Authors | Stabilization Criterion (wt. %) | Alloy | Sensitizing Treatment | Test of Sensitization | Wt. % Titanium Required to Stabilize | |
|---|---|---|---|---|---|---|
| | | | | | HEAT A | HEAT B |
| Bond & Lizlovs[1] | Ti ≧ 6(C + N) or Ti > 14C | 18Cr—2Mo | 926° C.-1149° C./ 1 hr. W.Q. also TIG weld | A262E | ≧0.16 or >0.32 | ≧0.23 or >0.32 |
| Bond & Dundas[2] | Ti ≧ 0.15 + 3.7(C + N) | 18Cr—2Mo | Not Reported | Not Reported | 0.25 | 0.29 |
| Lula, Lena and Kiefer[3] | $\frac{Ti}{C} > 8 \sim 9$ | 16–28% Cr | Heliarc Weld | Krupp[6] | 0.184 | 0.184 |
| Troselius et al[4] | Ti ≧ 10 (C + N) | 18Cr—2Mo | TIG welded | A262E | 0.26 | 0.38 |
| Demo[5] | Graphical, f(Cr, C + N, Al) e.g. Ti > 1.1% for C + N = 500 ppm | 19% Cr | weld | A262D[7] | Not calculable | Not calculable |

[1]A. P. Bond and E. A. Lizlovs, J. Electrochem. Soc., 116, p. 1305 (1969)
[2]As cited by R. F. Steigerwald, H. J. Dundas, J. D. Redmond, and R. M. Davison, "The Physical Metallurgy of Fe—Cr—Mo Ferritic Stainless Steels" in Stainless Steel '77, Climax Molybdenum Company, 1977
[3]R. A. Lula, A. J. Lena, G. C. Kiefer, Trans. ASM, 46, p. 197 (1954)
[4]L. Troselius, I. Andersson, S. O. Bernhardsson, J. Degerbeck, J. Henrickson, A. Karlsson, Br. Corros. J., 10, p. 674 (1975)
[5]J. J. Demo, Met. Trans., 5, p. 2253 (1974)
[6]boiling 10% H$_2$SO$_4$ + 10% CuSO$_4$ for 48 hr. immersion period
[7]boiling 50% H$_2$SO$_4$ + 41.6 g/l Fe$_2$(SO$_4$)$_3$ The potential for sensitization to occur in heat A was checked against the criteria of the first four prior art teachings in Table II (the graphical method of Demo was inapplicable to heat A). The results are presented in Table II (column HEAT A). The results indicate that a minimum titanium content ranging from 0.16 to 0.26% is required to stabilize heat A. Since the titanium content of heat A (0.61 wt. percent) was greater than the minimum range, it was concluded that heat A should be immune to sensitization.

Specimens measuring 1.27 cm (0.5 in) square by 0.19 cm (0.75 in) in thickness were cut from cold rolled sheet stock of heat A and were encapsulated in quartz tubes measuring approximately 1.9 cm (0.75 in) in diameter. Prior to encapsulation, the quartz tubes were evacuated and back-filled with 1/6 atmosphere of argon. Groups of specimens were annealed for 1 hour at 800°, 900°, 1000°, 1100°, or 1200° C. and rapidly cooled by removing the quartz tubes from the furnace and breaking open under water. The one hour anneal at 1200° C. was selected to provide a uniform basis for the evaluation of sensitization resistance while conservatively simulating the thermal conditions accompanying fabrication by 4, 8, 16, 24, 48, or 96 hours. Almost all combinations of aging temperatures and times were investigated for specimens annealed at 800° and 1200° C., however, fewer combinations of aging temperatures and times were investigated for specimens quenched from 900°, 1000°, and 1100° C. For each combination of aging temperature and time, four specimens were aged to provide a measure of reliability. The samples were prepared for aging by wrapping in zirconium foil to minimize oxygen contamination and encapsulated in evacuated quartz tubes.

After aging, the samples were quenched by breaking the quartz tubes under water, vapor blasted to remove the oxide scale, electropolished for 5 minutes at approximately 2 amps/cm.$^2$ in a solution of 60% H$_3$PO$_4$+40% H$_2$SO$_4$ at 40°-60° C. (104°-140° F.), ultrasonically cleaned in detergent solution, and rinsed in distilled water. Accelerated intergranular corrosion tests were performed according to American Society for Testing and Materials (ASTM) specification A262E (Modified Strauss). Ductility was assessed by the simple bend test which is a part of the A262E procedure.

Specimens annealed at 800°, 900°, 1000°, 1100° and 1200° C. for 1 hour and quenched, but not aged, were not susceptible to intergranular corrosion, i.e., sensitization. This behavior was as predicted by the prior art teachings of Table II. It should be noted that at this stage of the heat treatment the specimens had been processed in a manner similar to the processing employed in the investigations reported in Table II. Embrittlement, however, was detected by the bend tests in some of these annealed and quenched samples. Three factors were found to contribute to the embrittlement. Large grain size alone, such as was found in the samples annealed at the higher temperatures, e.g., 1200° C., was sufficient to cause embrittlement. The embrittlement due to large grain size was exacerbated by the presence of $\sigma$ or $\alpha'$ phases formed during the aging treatments. The presence of $\sigma$ and $\alpha'$ in these specimens was determined by transmission electron microscopy and electron diffraction.

In the description of this invention, sensitization refers to intergranular corrosion (IGC), and, by logical extension, to intergranular stress corrosion cracking (IGSCC), as measured by Modified Strauss tests of the ASTM A262E type. The so-called failure mode of such sensitized stainless steels was principally intergranular. Slight cracking due to sensitization refers to the situation where the specimen exhibited at its surface isolated, i.e., non-linked, grain boundary cracks traversing one to two grains and not penetrating more than about 2$\mu$ below the surface. Where the cracking due to sensitization is characterized as moderate, the specimen typically exhibited extensive surface cracks, i.e., cracking of about 90% of the grain boundaries, but the cracks penetrated less than about two grain diameters below the surface. The threshhold for severe cracking due to sensitization was the ability to observe cracking with the unaided eye as opposed to slight and moderate sensitization which required optical magnification for observation. If no cracks were observed by light microscopy at 400$\times$, the specimens were considered to be free of sensitization. This last criterion is somewhat more conservative than that of ASTM A262E which specifies 250$\times$ magnification rather than 400$\times$. A heat was considered to fail the sensitization test if severe cracking due to sensitization was observed following more than one aging treatment.

Embrittlement refers to mechanical cracking as measured by a simple bend test on thin coupons which is an inherent part of the ASTM A262E. test. The so-called failure mode of such embrittled stainless steels was principally transgranular cleavage. Slight embrittlement refers to several isolated cracks orginating at the surface and extending one to two grain diameters into the specimen. Under conditions of moderate embrittlement, the specimen generally contained one large crack transverse to the width of the sample at the point of maximum bend radius and penetrating to a depth of one or two grain diameters. Severely embrittled specimens exhibited extensive macrocracking and fractured with little or no ductility in the bend test.

FIG. 1 shows in graphical form the data for specimens from heat A annealed for 1 hour at 1200° C. and water quenched prior to aging for the times and temperatures noted by the data symbols on FIG. 1. Embrittlement due to $\sigma$ phase, embrittlement due to $\alpha'$ phase and a region of sensitization are shown on FIG. 1. Embrittlement by $\sigma$ phase resulting from the high temperature aging treatments (about 600° C. to 800° C.) was expected due to the relatively high chromium content (18%) in the presence of molybdenum. Also expected, due to the relatively high chromium content, was the embrittlement from $\alpha'$ resulting from the low temperature aging treatments (about 400° C. to 600° C.).

That any sensitization occurred in this ferritic stainless steel was completely unexpected based on the prior art teachings and predictions based on Table II; thus the large extent of the temperature-time region, shown on FIG. 1, over which sensitization occurred was also surprising.

Additional selected ASTM A262E tests were performed in accordance with the method discussed above on a second heat of commercially available 18%Cr—2%Mo stainless steel. This second heat is identified as heat B in Table I. Heat B, with a titanium content of 0.32 wt. percent, was predicted to be insensitive to sensitization by two of the formulas of Table II (Bond & Lizlovs and Lula et al.) and borderline by a third (Bond & Dundas). Again, the formula of Demo was not useable.

Figure 2:
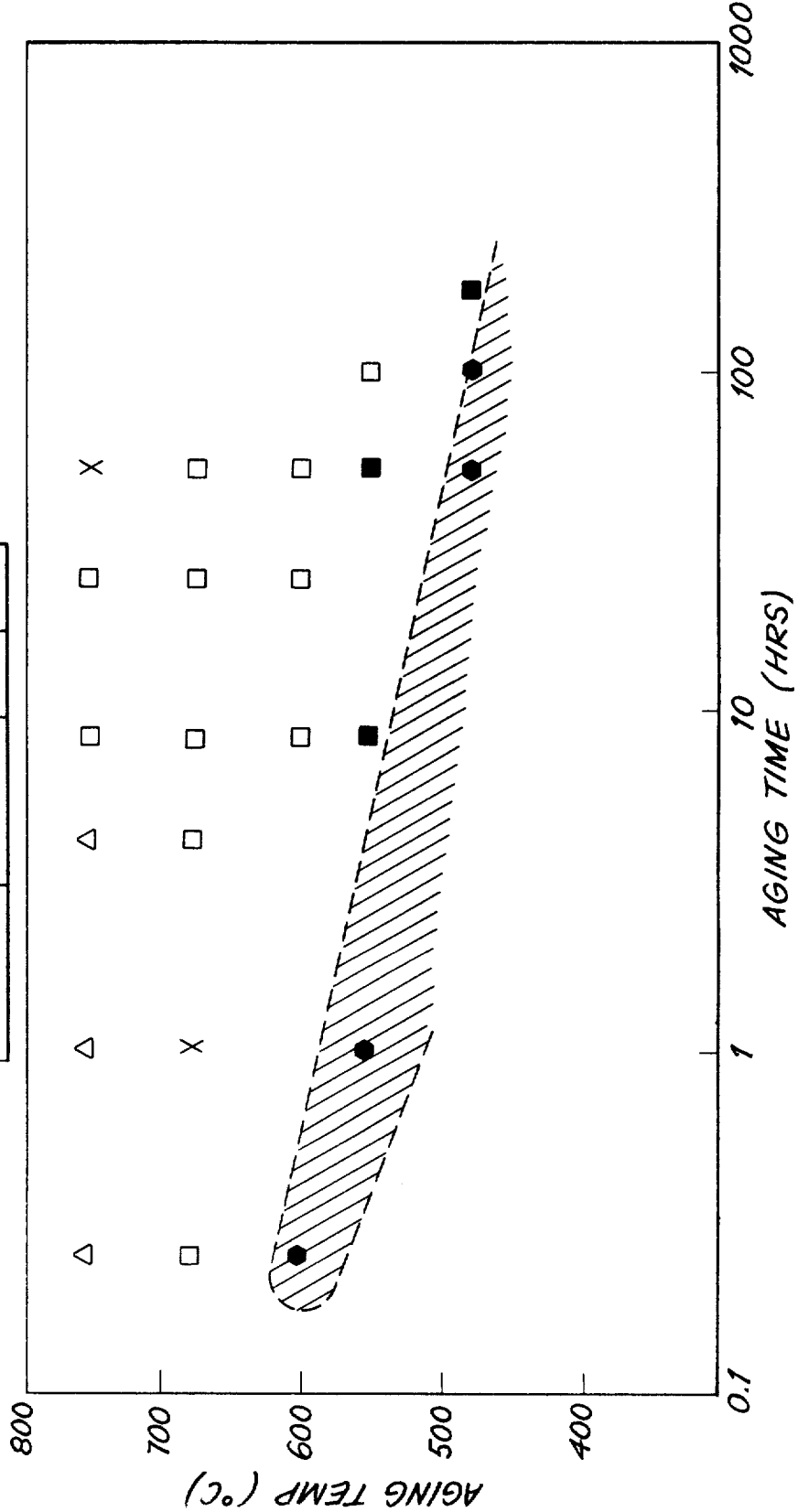
FIG. 2 is a semilogarithmic graph of the embrittlement and sensitization of heat B as functions of aging time and aging temperature following water quenching after an anneal for 1 hour at 1200° C.

The tests on heat B focused on the behavior in the ASTM A262E test resulting from various aging treatments following water quenching from a 1 hour anneal at 1200° C. The results of tests on heat B specimens annealed at 1200° C. are summarized in FIG. 2. It should be noted that the embrittlement by $\sigma$ phase, embrittlement by $\alpha'$ phase and the unexpected sensitization of heat B was similar in extent and severity to that of heat A.

Figure 3:
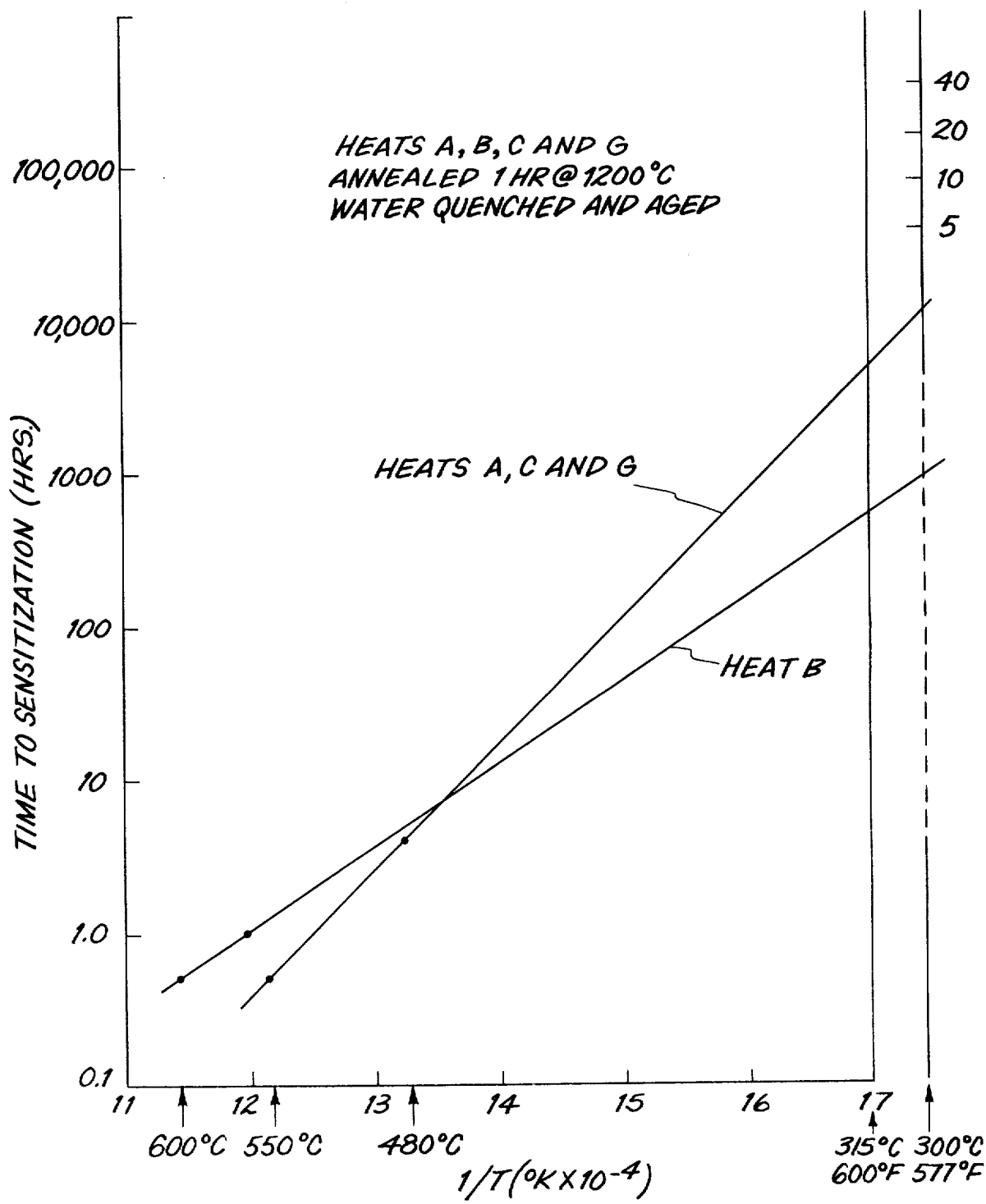
FIG. 3 is a semilogarithmic graph of the minimum observed time for sensitization to occur versus inverse absolute temperature whereon the time for sensitization to occur in heats A, B, C, and G is extrapolated to the typical service temperatures of moisture separator reheaters and feedwater preheaters.

The time to failure by sensitization, i.e., intergranular corrosion, of heats A and B was extrapolated to the service temperature of moisture separator reheaters and feedwater preheaters (about 300° C.) using the shortest observed time to failure at each aging temperature. This extrapolation is shown in FIG. 3 wherein the time to failure is plotted semilogarithmically versus inverse temperature. Heat A by these tests was predicted to fail in a little over 1 year and heat B in about a month. These predicted minimum times to failure were considerably less than the service life (about 40 years) anticipated for MSR and FWP equipment having ferritic stainless steel tubes even with a reasonable allowance for statistical variations attendant this type of extrapolation to long times.

Five experimental heats of 18%Cr—2% Mo ferritic stainless steel were then melted with the objective that under conditions of varying levels of carbon and nitrogen the titanium levels should be in considerable excess of the levels that would be selected based on Table II. Based on the above-cited work of Demo and Abo et al., the levels of titanium were also above those previously considered desirable from the standpoint of avoiding mechanical embrittlement inherent in the addition of titanium to ferritic stainless steels. Those heats are listed as heats C through G on Table I. Heat F was evaluated although it did not meet the above-stated objective since the target values of the melting specification were not met. The titanium content of heat F met or exceeded the criteria of the first three formulas listed on Table II, was less than the criteria of the fourth (Troselius et al.) and could not be evaluated by the fifth (Demo).

Using the same general method discussed above for the 18%Cr—2%Mo ferritic stainless steels, the susceptibility of heats C through G to sensitization, as measured by the ASTM A262E test, was evaluated. Specimens from heats C, D, F, and G were aged at temperatures which also permitted an evaluation of embrittlement as part of the A262E test, however, heat C was not aged above temperatures (550° C.) where embrittlement was anticipated.

Of the specimens from heats C through G, annealed for 1 hour at 1200° C., water quenched and aged, those from heats D and E were found not to be susceptible to sensitization whereas those from heats C, F, and G were sensitized. Heats D and G exhibited embrittlement due to the presence of $\sigma$ and $\alpha'$ on the same order as that exhibited by heats A and B. However, heats C and F did not exhibit embrittlement. Additionally, specimens of heats A through G which were annealed at 800° C. for 1 hour prior to water quenching and aging exhibited neither sensitization nor embrittlement irrespective of aging time and temperature.

Based on the data from the five experimental 18%Cr—2%Mo heats, two new experimental heats were meltedand evaluated. In these heats, designated as heats AA and BB in Table III, below, the chromium content was reduced to nearly the minimum required for corrosion resistance (i.e., 12%), molybdenum was excluded to minimize the possibility of embrittlement due to $\sigma$ phase, and titanium was added in excess of the teachings of Table II.

mens from heats AA and BB water quenched after a 1 hour anneal at 800° C. did not exhibit sensitization or embrittlement irrespective of aging time or temperature.

The minimum observed time to failure by sensitization, i.e., intergranular corrosion, of heats AA and BB was extrapolated to the service temperature of moisture separator reheaters and feedwater preheaters (about 300° C.) using the shortest observed time to failure at each aging temperature. This extralation is shown in FIG. 5 wherein the time to failure is plotted semilogarithmically versus inverse temperature. As was the case for 18%Cr—2%Mo heats A and B, discussed above, the extrapolated minimum time to failure was considerably less than the service life (about 40 years) anticipated for heat exchanger equipment having ferritic stainless steel tubes even with a reasonable allowance for statistical variations attendant this type of extrapolation to long times.

An additional 14 experimental heats of 12% chromium were melted with the objective that under conditions of varying levels of carbon and nitrogen the titanium levels should be in considerable excess of the levels that would be selected on the basis of Table II. These heats are listed as heats CC through PP in Table III.

TABLE III

| Compositions[1] of 12% Chromium Ferritic Stainless Steels (wt. %) | | | | | | | | | | | | | |
|---|---|---|---|---|---|---|---|---|---|---|---|---|---|
| Heat | C | Si | Mn | P | S | Cr | Ti | N | Bal.[2] | Ti/c | Ti/N | $\frac{Ti}{(C+N)}$ | Sensitization Resistance Evaluation |
| AA(561) | 0.009 | 1.0 | 1.0 | 0.04 | 0.03 | 12.77 | 0.16 | 0.002 | Fe | 17.8 | 80.0 | 14.5 | FAIL |
| BB(541) | 0.034 | ↓ | ↓ | ↓ | ↓ | 12.00 | 0.40 | 0.013 | Fe | 11.7 | 30.8 | 8.5 | FAIL |
| CC(581) | 0.002 | ↓ | ↓ | ↓ | ↓ | 13.20 | 0.42 | 0.011 | Fe | 210.0 | 38.2 | 32.3 | PASS |
| DD(582) | 0.006 | ↓ | ↓ | ↓ | ↓ | 12.66 | 0.40 | 0.018 | Fe | 66.7 | 22.2 | 16.7 | FAIL |
| EE(585) | 0.004 | ↓ | ↓ | ↓ | ↓ | 12.85 | 0.31 | 0.007 | Fe | 77.5 | 44.3 | 28.2 | PASS |
| FF(586) | 0.004 | ↓ | ↓ | ↓ | ↓ | 13.32 | 0.23 | 0.007 | Fe | 57.5 | 32.9 | 20.9 | PASS |
| GG(640) | 0.001 | ↓ | ↓ | ↓ | ↓ | 12.48 | 0.42 | 0.022 | Fe | 420.0 | 19.1 | 18.3 | PASS |
| HH(642) | 0.003 | ↓ | ↓ | ↓ | ↓ | 12.57 | 0.45 | 0.028 | Fe | 150.0 | 16.1 | 14.5 | PASS |
| II(613) | 0.011 | ↓ | ↓ | ↓ | ↓ | 12.62 | 0.51 | 0.013 | Fe | 46.4 | 39.2 | 21.3 | FAIL |
| JJ(638) | 0.012 | ↓ | ↓ | ↓ | ↓ | 12.78 | 0.46 | 0.010 | Fe | 38.3 | 46.0 | 20.9 | FAIL |
| KK(639) | 0.012 | ↓ | ↓ | ↓ | ↓ | 12.44 | 0.45 | 0.013 | Fe | 37.5 | 34.6 | 18 | FAIL |
| LL(614) | 0.012 | ↓ | ↓ | ↓ | ↓ | 12.68 | 0.51 | 0.012 | Fe | 42.5 | 42.5 | 21.3 | FAIL |
| MM(615) | 0.012 | ↓ | ↓ | ↓ | ↓ | 12.72 | 0.52 | 0.014 | Fe | 43.3 | 37.1 | 20.0 | FAIL |
| NN(637) | 0.015 | ↓ | ↓ | ↓ | ↓ | 12.69 | 0.47 | 0.013 | Fe | 31.3 | 36.2 | 16.8 | FAIL |
| OO(643) | 0.033 | ↓ | ↓ | ↓ | ↓ | 12.44 | 0.53 | 0.006 | Fe | 16.1 | 88.3 | 13.6 | FAIL |
| PP(641) | 0.033 | ↓ | ↓ | ↓ | ↓ | 12.64 | 0.49 | 0.007 | Fe | 14.9 | 70.0 | 12.3 | FAIL |

[1]Heats AA-PP by analysis except Si, Mn, P, and S; max per specification
[2]Plus incidental impurities Using the same general method discussed above, the susceptibility of these 12%Cr heats (AA and BB) to sensitization and embrittlement, as measured by the ASTM A262E test, was evaluated. The only significant change from the general method discussed above for these experimental 12%Cr stainless steels, and the ones discussed below, was that the concentration of the $H_2SO_4$ solution used in the ASTM A262E test was about 0.5 weight percent instead of about 16 weight percent. Use of 5.0 weight percent $H_2SO_4$ solution was determined to be sufficient to detect sensitization, yet below the concentration which would cause rapid general corrosion of unsensitized 12%Cr stainless steels.

Specimens from heats AA and BB annealed at 1200° C. for 1 hour, water quenched, and aged did not embrittle. However, again and surprisingly, sensitization of about the same magnitude and extent as exhibited previously by specimens from heats A and B, occurred in these 12% Cr heats. The data from the tests on heat AA following the 1 hour anneal at 1200° C., which are representative of the data from heat BB under the same conditions, are shown graphically on FIG. 4. Specimens

III.

Material from heats CC through PP was heat treated in the same general manner as were heats AA and BB except annealing for 1 hour prior to water quenching was conducted only at 800° and 1200° C. and with but a few minor exceptions for heats CC and DD, aging was conducted in accordance with Table IV, below.

TABLE IV

| Aging Temperatures and Times for Experimental 12% Cr Stainless Steels | | | | | | | | | | |
|---|---|---|---|---|---|---|---|---|---|---|
| Aging Temperature °C. | Aging Time (Hours) | | | | | | | | | |
| | ¼ | ½ | 1 | 2 | 4 | 8 | 16 | 32 | 48 | 96 |
| 600 | X | X | X | | | | | | | |
| 550 | X | X | X | X | X | | | | | |
| 480 | X | X | X | X | X | X | | | | |
| 415 | | | | | | X | X | X | X | X |

The results of the ASTM A262E tests on the specimens from heats CC through PP annealed at 1200° C. for 1 hour prior to water quenching are summarized in Table III in terms of passing or failing vis-a-vis susceptibility to sensitization.

As noted in Table III, 12% Cr experimental heats CC, EE, GG, and HH were considered to have passed by not exhibiting cracking due to sensitization according to the standard set forth above. Also, no cracking due to embrittlement, as measured by the bend tests of ASTM A262E, was observed in any of heats CC through PP at aging temperatures less than or equal to 600° C. irrespective of the aging time. Additionally, no sensitization and no embrittlement was observed in any specimen from heats AA through PP annealed at 800° C. for 1 hour, prior to water quenching, at any aging temperature irrespective of the aging time.

Autogenous bead-on-plate welds were made on samples from heats C, D, CC, DD, EE, and FF using the tungsten inert gas (TIG) welding process. The samples were annealed for 1 hour at 800° C. and water quenched prior to welding. The welding conditions were 35 amperes, 10 volts, and 4 in/min torch travel speed with 15CFH argon flowing through the torch. The underbead area was shielded with 15-20 CFH flowing argon.

As-welded and welded specimens aged at 600° C. for ¼, ½, and 1 hour; at 550° C. for ¼, 1 and ½, 2, and 4 hours; at 480° C. for 1, 2, 4, and 8 hours; and at 415° C. for 96 hours were tested for sensitization by the ASTM A262E type tests described above. For heat CC, additional welded specimens were aged at 415° C. for 8, 10 and ½, and 50 hours.

The heat-affected-zones, fusion zones, and base metal portions of all specimens from the six heats passed the pass/fail sensitization evaluation criterion described in detail above. Heats C and DD passed the sensitization test in the as-welded and welded and aged conditions, although they failed the sensitization test after an initial anneal at 1200° C. for 1 hours. The behavior of heats C and DD was not unanticipated since the welding conditions employed represented a less severe thermal treatment of the material than that imparted by the primary test selected for evaluation of the resistance of the steels of this invention to sensitization, i.e., those beginning with a 1 hour anneal at 1200° C.

Based on the data of Tables I and III there is provided by this invention two new ferritic stainless steels. These stainless steels are particularly suitable for use as welded heat exchanger tubing in the low temperature water chemistry environments typically found in such units as moisture separator reheaters and feedwater preheaters.

An 18% chromium—2% molybdenum version consists essentially of, in weight percent, 0.025% max carbon, 0.025% max nitrogen, 1.0% max silicon, 1.0% max manganese, 0.04% max phosphorous, 0.03% max sulfur, 18 to 20% chromium, 1.75 to 2.25% molybdenum, titanium in percentage selected such that the titanium-to-carbon ratio is equal to or greater than about 45, the sum of carbon plus nitrogen is 0.045% max, and the balance is iron plus impurities. A 12% chromium version consists essentially of, in weight percent, 0.025% max carbon, 0.025% max nitrogen, 1.0% max silicon, 1.0% max manganese, 0.04% max phosphorous, 0.03% max sulfur, 12 to 13% chromium, titantium in percentage selected such that the titanium-to-carbon ratio is equal to or greater than about 50, the sum of carbon plus nitrogen is 0.045% max, and the balance is iron plus impurities.

The unspecified impurities which may be present in these novel alloys may be introduced in or accompany the process of alloy manufacture in accordance with common steel-making processes and do not materially affect the basic and novel characteristics of the claimed alloys. Such incidental impurities may include, as a maximum, 0.60% Ni, 0.30% Cu, 0.30% Co, and/or 0.40% Al.

In contradistinction to many of the stainless steel compositions found in the literature, the titanium content of these new alloys is not a direct function of the nitrogen content either alone or in combination with carbon so long as the carbon and nitrogen levels are maintained less than or equal to 0.025% each and their sum is maintained less than or equal to 0.045%. Titanium levels significantly in excess of those needed to give the required minimums of the stated titanium-to-carbon ratios is to be discouraged both on economic grounds and on technical grounds, i.e., the inherent tendency of titanium to impart brittleness in ferritic stainless steels especially in thick sections.

The ferritic stainless steels of the present invention are particularly suitable for use in the as-welded condition as tubing in heat exchangers, such as moisture separator reheaters and feedwater preheaters, frequently found in the steam supply systems of fossil-fired and nuclear fueled commercial electrical power generating stations. Other applications, particularly those requiring resistance to sensitization in service environments encompassing intermediate temperatures for long periods of time, may be made within the ordinary skill in the art without departing from the spirit and scope of the invention, said invention being limited only by the scope of the appended claims.

I claim:

1. In the method for making moisture separator reheater and feedwater preheater apparatus for the exchange of heat in which a plurality of thin-walled metal members are formed, welded, finned and affixed to tube sheets in an array with gaps between said members the improvement of using as a metal for the walls of said members a titanium-stabilized and corrosion resistant ferritic stainless steel resistant to sensitization during long-term operation at intermediate temperatures in said apparatus for the exchange of heat and consisting essentially of, in weight percent:

| | |
|---|---|
| Carbon | = 0.025% max |
| Nitrogen | = 0.025% max |
| Carbon + Nitrogen | = 0.045% max |
| $\left(\dfrac{\text{Titanium}}{\text{Carbon}}\right)$ | $\geq 45$ |
| Silicon | = 1.0% max |
| Manganese | = 1.0% max |
| Phosphorous | = 0.04% max |
| Sulfur | = 0.03% max |
| Chromium | = 18-20% |
| Molybdenum | = 1.75-2.25% | the balance being iron and incidental impurities.

* * * * *